(12) United States Patent
Salmivalli

(10) Patent No.: US 7,318,159 B2
(45) Date of Patent: Jan. 8, 2008

(54) DETECTING COPIED IDENTITY OF TERMINAL EQUIPMENT

(75) Inventor: Mika Salmivalli, Ylöjärvi (FI)

(73) Assignee: Nokia Siemens Networks Oy, Espoo (FI)

( * ) Notice: Subject to any disclaimer, the term of this patent is extended or adjusted under 35 U.S.C. 154(b) by 128 days.

(21) Appl. No.: 10/014,804

(22) Filed: Dec. 14, 2001

(65) Prior Publication Data

US 2002/0120873 A1    Aug. 29, 2002

Related U.S. Application Data

(63) Continuation of application No. PCT/FI00/00531, filed on Jun. 13, 2000.

(30) Foreign Application Priority Data

Jun. 15, 1999  (FI)  ..................... 991371

(51) Int. Cl.
*H04L 9/32*  (2006.01)

(52) U.S. Cl. ............... 713/185; 380/270; 455/410; 455/411

(58) Field of Classification Search ........... 713/185; 455/414, 432.3, 419, 437, 403, 410–411, 455/514, 423, 414.2, 424–425, 404.2, 456.1; 370/356; 709/224; 380/258, 270
See application file for complete search history.

(56) References Cited

U.S. PATENT DOCUMENTS

| 5,887,253 | A | | 3/1999 | O'Neil et al. |
| 5,907,804 | A | * | 5/1999 | Schroderus et al. ........ 455/411 |
| 6,091,946 | A | | 7/2000 | Ahvenainen |
| 6,124,799 | A | * | 9/2000 | Parker ........................ 340/5.85 |
| 6,148,192 | A | * | 11/2000 | Ahvenainen ................ 455/410 |
| 6,148,197 | A | * | 11/2000 | Bridges et al. .......... 455/432.3 |
| 6,272,129 | B1 | * | 8/2001 | Dynarski et al. ........... 370/356 |
| 6,427,073 | B1 | * | 7/2002 | Kortesalmi et al. ...... 455/414.1 |

FOREIGN PATENT DOCUMENTS

| DE | 195 39 372 | 4/1997 |
| EP | 711 090 | 5/1996 |
| WO | WO 96/36194 | 11/1996 |
| WO | WO 98/12891 | 3/1998 |
| WO | WO 98/59514 | 12/1998 |
| WO | WO 99/04587 | 1/1999 |

* cited by examiner

*Primary Examiner*—T. B. Truong
(74) *Attorney, Agent, or Firm*—Pillsbury Winthrop Shaw Pittman LLP; Larry J. Hume

(57) ABSTRACT

The invention relates to a mobile system and especially to detecting, in the mobile system in question, the use of terminal equipment having a copied mobile equipment identity. In the invention, a database containing records is created, each record containing an international mobile equipment identity associated with a mobile station and an international mobile subscriber identity, a check is made to see whether the database contains a record which contains a mobile equipment identity corresponding to the mobile equipment identity transmitted by the mobile station, but whose mobile subscriber identity does not correspond to that transmitted by the mobile station, and if yes, at least a signal is produced, indicating that the mobile equipment identity is possibly a copied one.

12 Claims, 3 Drawing Sheets

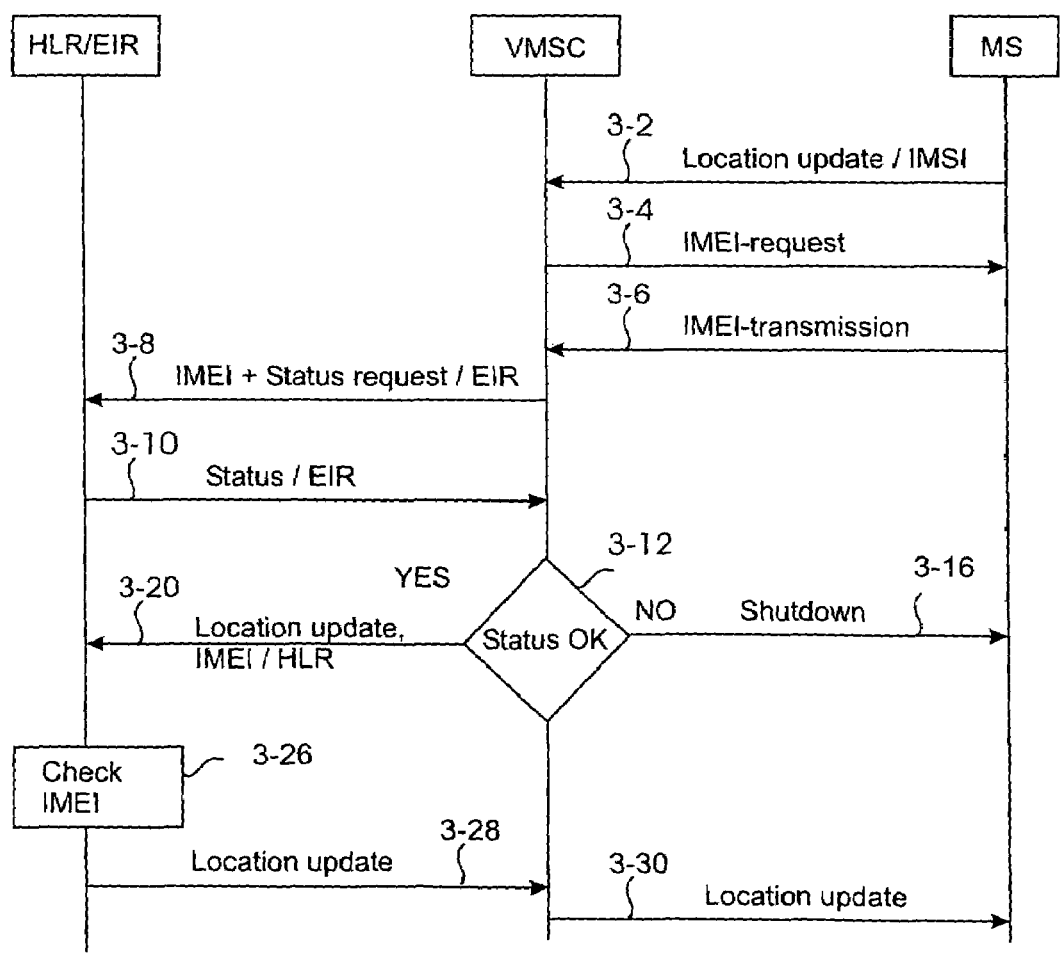

DETECTING COPIED IDENTITY OF TERMINAL EQUIPMENT

This application is a Continuation of International Application PCT/FI00/00531 filed Jun. 13, 2000 which designated the U.S. and was published under PCT Article 21(2) in English.

BACKGROUND OF THE INVENTION

The invention relates to mobile systems and especially to detecting, in a mobile system, the use of a terminal whose equipment identity has been copied.

In many mobile systems, subscribers and terminal equipment have not been bound together in a fixed manner, but they use subscriber-specific identity modules and individual equipment identities to distinguish terminal equipment from each other. The identity module used to identify the subscriber, such as the SIM card (subscriber identity module) used in the pan-European digital cellular radio system GSM (Global System for Mobile Communications), is a smart card attached to the terminal, allowing the subscriber to use the terminal and containing information for identifying the subscriber, for instance. An example of such an identity module is the IMSI (international mobile subscriber identity) used in the GSM system and comprising a mobile station country code, a mobile network identity and a subscriber identity.

The mobile station MS shown in FIG. 1 comprises terminal equipment TE and a 1-2 smart card SIM attachable to the terminal equipment. In the GSM system, an IMEI (international mobile equipment identity) identifying the equipment is typically stored in the programmable memory of the terminal equipment, e.g. in the EEPROM (electrically erasable programmable read only memory), during the manufacture of the terminal. The IMEI comprises a type approval code, a final assembly code and a serial number.

Mobile networks contain a facility in which the equipment identity of a terminal is checked to ensure that the terminal in question is not stolen, for instance, or that the use of the terminal equipment does not cause interference in the mobile network. The equipment identity can, for instance, be requested when the terminal equipment has set up a connection to a mobile switching centre or is performing a location update. After this, the equipment identity is compared with the equipment identities in the EIR (equipment identity register) or elsewhere in the mobile system, and on the basis of the comparison, the use of the terminal equipment is either prevented or allowed.

Prior art with respect to equipment identification is described in the publication WO96/36194 "Checking the Access Right of a Subscriber Equipment". In it, when a terminal registers into a mobile system, the system acquires the information related to the subscriber. At the same time, the mobile station also transmits its own equipment identity to the mobile system. After this, the equipment identity transmitted by the mobile station is compared with the equipment identities allowed for the subscriber identity transmitted by said mobile station and stored in the home database and if the equipment identity transmitted by said mobile station is found among the equipment identities allowed for said subscriber identity, the operation of the mobile station continues normally. Otherwise, the use of the mobile station is prevented.

Even though in the above publication, the validity of the operation of the mobile station is checked by comparing the equipment identity transmitted by the mobile station with the identity or identities allowed for the subscriber in question in the home database, a problem with the arrangement described in said publication is that it does not check whether there is more than one mobile station registered into the mobile system with the same terminal equipment identity. Neither does the arrangement described in the publication check the subscriber identities of mobile stations which are registered at the same time with the same equipment identity. The prior art presented in the publication thus cannot detect mobile stations whose equipment identities have been copied.

The equipment identity IMEI of the mobile station MS shown in FIG. 1 can be cloned, i.e. copied, during manufacture, for instance. In such a case, an equipment identity already in use is programmed into the memory of what is known as null-IMEI equipment (terminal equipment with no equipment identity stored in its memory as yet). After this, the terminals in question cannot be distinguished from each other, since their identities are identical.

This programming can also be done after the terminal equipment has received its individual equipment identity. In such a case, the equipment identity of a stolen terminal, for instance, is deleted from the programmable memory of the terminal with ultraviolet light and a new equipment identity is programmed in place of the old equipment identity.

BRIEF DESCRIPTION OF THE INVENTION

It is an object of the invention to develop a method and an apparatus implementing the method so as to solve the above-mentioned problem. The object of the invention is achieved by a method and apparatus characterized by what is stated in the independent claims. Preferred embodiments of the invention are set forth in the dependent claims.

The invention is based on the idea that in the method, information on the equipment identities IMEI of the terminal equipment of mobile stations already registered into the system and on the subscriber identities IMSI is maintained in a database of the network infrastructure, a first comparison is performed by checking whether the equipment identity transmitted by the mobile station to the network infrastructure exists among the equipment identities already in said database, and if it exists, another comparison is performed to see whether the mobile station has the same subscriber identity as the mobile stations having said identical equipment identity in the network infrastructure database, and if it has, the operation of the mobile station is continued. If the subscriber identities of the second comparison are not identical, at least a signal is produced to indicate a possibly copied equipment identity. These comparisons can be performed when a mobile station registers into a mobile system, for instance, and/or during a location update between switching centres.

The method and system of the invention provide the advantage that it is possible to detect the use of a mobile station having a copied equipment identity. This provides the further advantage that an operator can take measures against such terminal equipment without the measures affecting the operation of other mobile stations.

In a preferred embodiment of the invention, the use of a mobile station having a copied equipment identity is prevented. This provides the further advantage that the mobile station can be immediately shut down.

In another preferred embodiment of the invention, an equipment identity is stored individually in a home location register HLR instead of the equipment identity register EIR. This provides the advantage that the equipment identity IMEI can be checked quicker than when the equipment identity is stored in the equipment identity register.

BRIEF DESCRIPTION OF THE FIGURES

In the following, the invention will be described in greater detail by means of preferred embodiments and with reference to the attached drawings in which FIG. 2B shows an IMSI/IMEI database formed by mobile stations, in which one record contains one or more subscriber and equipment identities, FIG. 3A is a signalling diagram of the operation of the method and mobile system of an embodiment.

DETAILED DESCRIPTION OF THE INVENTION

In the following, the invention will be described using the GSM system as an example, but the invention can also be applied to systems derived from the GSM system, such as DCS1800 (Digital Communication System) and PCN (Personal Communication Network), and in other systems, such as third-generation mobile systems according to the TETRA (Trans-European Trunked Radio) standards being currently developed, in the UMTS system (Universal Mobile Telecommunications System), for instance.

Figure 1:
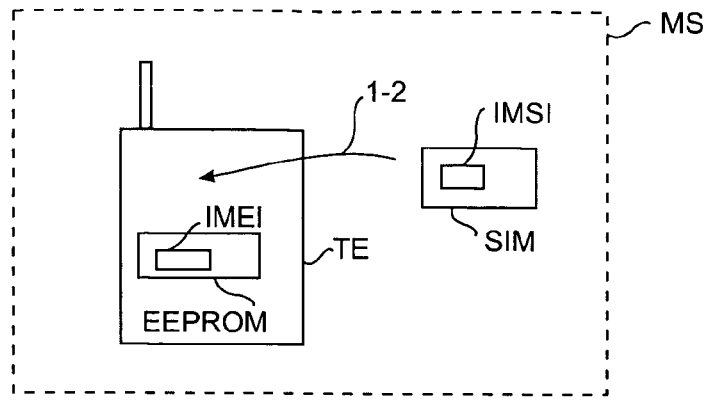
FIG. 1 shows a mobile station comprising terminal equipment and a subscriber identity module.
Figure 2A:
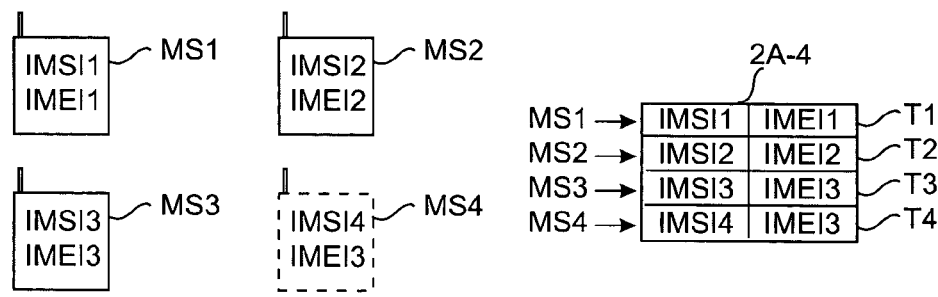
FIG. 2A shows mobile stations and an IMSI/IMEI pair database they form.

FIG. 2A shows mobile stations and a database of IMSI/IMEI pairs formed by them. Mobile stations already registered into a mobile system are referred to as MS1, MS2 and MS3 having corresponding individual equipment identities IMEI1, IMEI2 and IMEI3 and corresponding individual subscriber identities IMSI1, IMSI2 and IMS3. MS4 is a new mobile station trying to register into the network. Its subscriber identity is IMSI4 and equipment identity is IMEI3, i.e. the same as that of the mobile station MS3 which has registered earlier.

The mobile station MS4 can when registering into the network, for instance, or when the network separately requests it, transmit its subscriber identity and equipment identity to the system. The system, however, notices that the equipment identity of MS4 is the same as that of a mobile station already registered and accepted into the system, namely MS3. As a result of this, the subscriber identities of the mobile stations are compared with each other. Because the IMSI check shows that the subscriber identities (IMSI) are not identical, operation of the mobile station MS4 trying to register is limited, or at least a signal is produced to indicate that the equipment identity is possibly a copied one.

The subscriber identities and equipment identities in FIG. 2A can be associated with each other to form a database 2A-4. Then, the subscriber identities IMSI1, IMSI2, IMSI3 and IMSI4 of the mobile stations MS1, MS2, MS3 and MS4 are associated with the corresponding equipment identities IMEI1, IMEI2, IMEI3 and IMEI3, and each subscriber identity-equipment identity pair forms one record (T1 to T4).

In third-generation mobile systems, for instance, one record can, if necessary, contain several subscriber and equipment identities. FIG. 2B shows an IMSI/IMEI database formed by mobile stations, in which one record (T5 to T8) contains one or more subscriber and equipment identities. In FIG. 2B, corresponding individual equipment identities (IMEI1A, IMEI1B, IMEI1C), (IMEI2A, IMEI2B, IMEI2C), (IMEI3A, IMEI3B, IMEI3C) and (IMEI3C) and corresponding individual subscriber identities (IMSI1A, IMSI1B), (IMSI2A, IMSI2B), (IMSI3A, IMSI3B) and (IMSI4A, IMSI4B) are associated with the mobile stations (MS1), (MS2), (MS3) and (MS4).

Figure 2C:
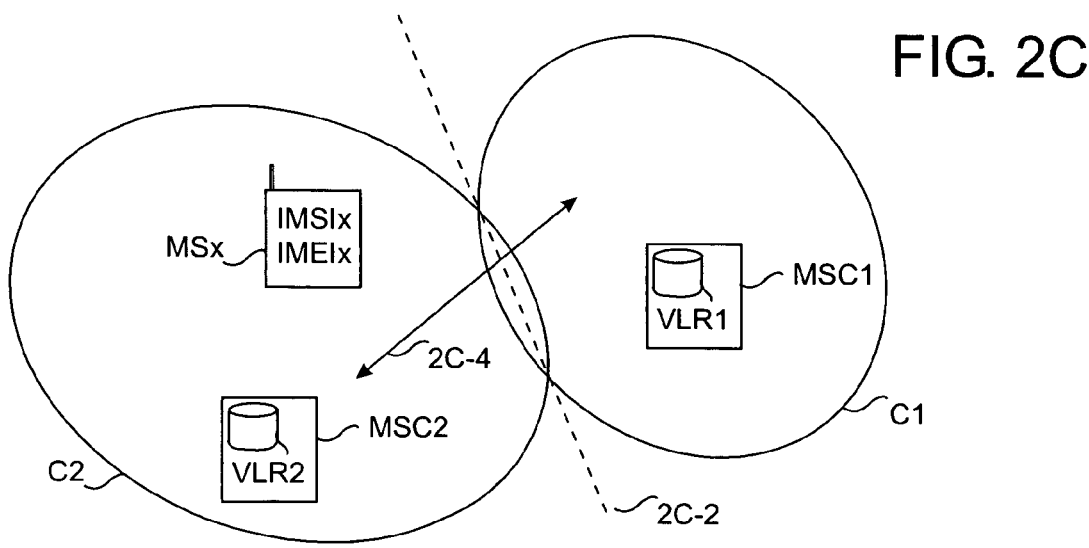
FIG. 2C is a block diagram of a mobile system in which only one mobile station is registered.

The present solution differs from the prior art solution by the fact that the equipment identities can also be compared with each other in addition to checking whether the IMEI in question is allowed for the subscriber identity in question. This makes it possible to detect copied equipment identities. FIG. 2C shows two cells C1, C2 and the border 2C-2 between them. In this example, both cells have their own mobile services switching centre MSC1 and MSC2 and their own visitor location register VLR1 and VLR2 connected to the switching centres.

In the situation in FIG. 2C, a mobile station MSx registered into the system moves 2C-4 across the border 2C-2 of said cells. Then, visitor location registers of both cells may receive information on the subscriber identity and equipment identity of the mobile station in question when the mobile station updates its location. The subscriber identity in question need, however, not be the same subscriber identity as that with which the comparison is made. In GSM networks, for instance, a subscriber identity transmitted across the radio path can be a TMSI (temporary mobile subscriber identity), but the comparison is made with the IMSI (international mobile subscriber identity) corresponding to the TMSI. Since the subscriber identity and the equipment identity are now identical, the operation of the mobile station moving in the area of said two adjacent cells is not limited.

FIG. 3A shows a signalling diagram of the operation of the method and mobile system of an embodiment of the invention. In the figure, MSCNLR, in short VMSC (visited mobile switching centre), illustrates the switching centre and its visitor location register. HLR/EIR illustrates the home location register of the mobile station and the equipment identity register, which in this example are connected to each other. For clarity's sake, the signalling diagram does not show the entire call set-up, subscriber identification, subscriber parameter request or the release of signalling in detail. Neither does the signalling diagram show the effect of the above facilities on a base transceiver station BTS or base station controller BSC. A more detailed description of the facilities can be found in the standard GSM0902.doc, version 4.17.1., FIGS. 16.1.1/1 to 16.1.1/3.

In step 3-2, the mobile station transmits a location update request to the switching centre/visitor location register VMSC in the cell where the mobile station is. After this, the VMSC asks in step 3-4 the mobile station to transmit its equipment identity. The transmission may either be encrypted or unencrypted. As state above, the subscriber identity being transmitted can be a temporary one (TMSI) or a permanent one (IMSI). In step 3-6, the mobile station transmits its own equipment identity to the VMSC. In step 3-8, the VMSC transmits the equipment identity received from the mobile station to the EIR and requests the status of the equipment identity in question, i.e. information on whether restrictions are set on the operation of the mobile station in question.

The GSM system equipment identity register EIR contains lists of terminal equipment identities: a white list on equipment allowed in the system, a black list on forbidden equipment and a grey list on equipment that are to be monitored by the system. In step 3-10, the EIR sends to the VMSC the status of the mobile station, i.e. information on which list the mobile station belongs to.

The EIR or a part of it may physically be located in the HLR or in some other mobile switching centre MSC. If the EIR is in the HLR, the IMEI check is faster, since the IMEI is already stored in the HLR and need not be fetched from a separate EIR.

In step 3-12, the VMSC checks the status of the mobile station received from the EIR. If the mobile station is on the white list, its operation is continued normally and in addition to the normal location update information, the equipment identity IMEI of the mobile station is transmitted to the home location register in step 3-20. If the mobile station is on the black or the grey list, its operation can, for instance, be limited or prevented in step 3-16. The mobile station can also be on the list of unknowns, if the EIR cannot identify its terminal equipment. In this case, too, the operation of the mobile station can be limited in step 3-16.

The signalling between the visitor location register and the home location register is done by means of a mobile application part MAP connection in an SS#7 signalling network according to the GSM specification, for instance.

In step 3-26, the routine checks from the database 2A-4, 2B-1 in the HLR whether the mobile station that just requested a location update has the same equipment identity as another mobile station in the database. If two mobile stations having the same equipment identity are not found, the location update information is transmitted in step 3-28 to the visitor location register and the operation of the mobile station is continued normally in step 3-30.

Figure 3B:
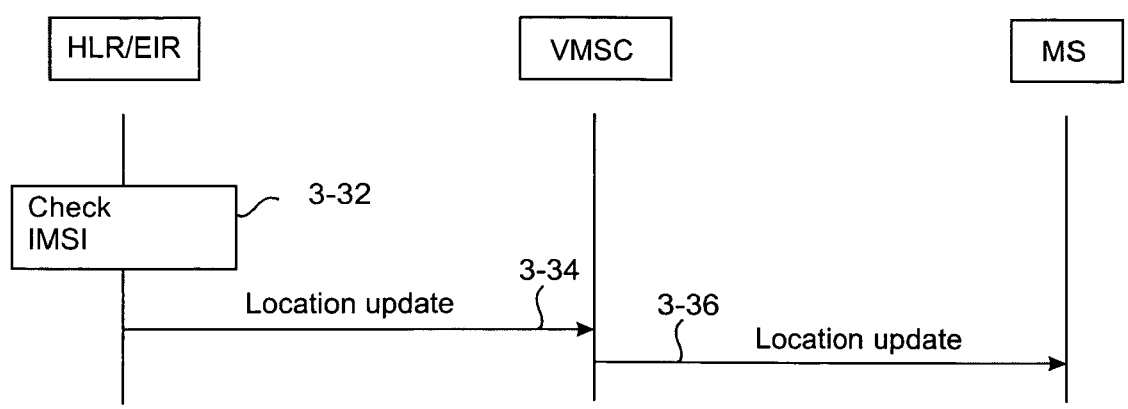
FIG. 3B is a signalling diagram of an IMSI check in a home location register.

FIG. 3B shows a signalling diagram of an IMSI check in the home location register. If in step 3-26, at least two mobile stations having the same equipment identity are found, a further check is made in step 3-32 to see whether said mobile stations have the same subscriber identity. If the mobile stations having the same equipment identity also have identical subscriber identities, the location update information is transmitted in step 3-34 to the visitor location register, and the operation of the mobile station is continued normally in step 3-36. The mobile stations are then still on the white list.

Figure 3C:
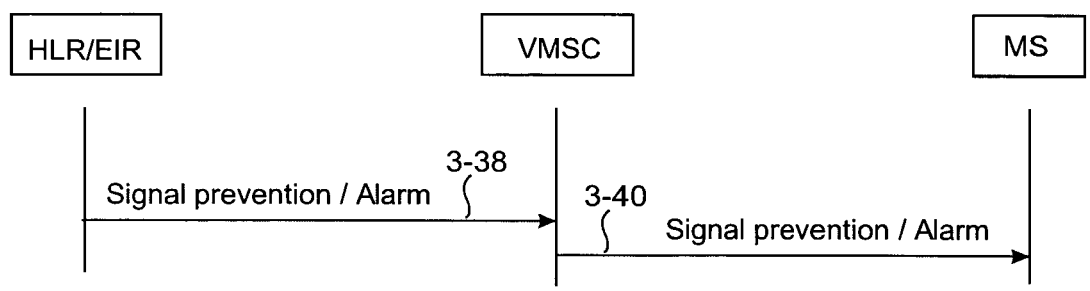
FIG. 3C is a signalling diagram of a prevention/alarm facility in a home location register.

If the mobile stations having the same equipment identity do not have identical subscriber identities, the operation of said mobile station requesting location updating can be limited: the location update may be prevented or an alarm may be given in step 3-38 to the VMSC, after which the operation of the mobile station may be prevented in step 3-40. These steps are described as the signalling diagram showing the prevention/alarm facility in FIG. 3C. It is also possible to transmit information to the EIR on the current, checked status of the equipment identity in question, after which the mobile station can be listed on the grey list for monitoring its operation, or on the black list for preventing its operation. The HLR can also maintain its own black list on equipment identities under monitoring.

It is obvious to a person skilled in the art that while technology advances, the basic idea of the invention can be implemented in many different ways. The invention and its embodiments are thus not limited to the examples described above, but can also vary within the scope of the claims.

What is claimed is:

1. A method for detecting a copied international mobile equipment identity in a mobile system in which at least one international mobile subscriber identity and a mobile equipment identity is associated with a mobile station, the method comprising:
    creating a database containing records which each contain a mobile equipment identity associated with a mobile station and at least one mobile subscriber identity,
    the mobile station transmitting the mobile equipment identity associated with the mobile station and at least one mobile subscriber identity,
    checking first whether there is a record in the database, which contains a mobile equipment identity corresponding to the mobile equipment identity transmitted by the mobile station, and
    if there is said record in the database, checking further in response to said record being found whether the record includes a mobile subscriber identity corresponding to the mobile subscriber identity transmitted by the mobile station, and, if there is no record in the database, producing at least a signal indicating that the mobile equipment identity is possibly a copied one.

2. A method as claimed in claim 1, wherein if the database contains a record which contains a mobile equipment identity corresponding to the mobile equipment identity transmitted by the mobile station, but whose mobile subscriber identity does not correspond to that transmitted by the mobile station, the operation of the mobile station is prevented.

3. A method as claimed in claim 2, wherein checking the mobile equipment identity is performed when the mobile station registers into the mobile system.

4. A method as claimed in claim 2, wherein checking the mobile equipment identify is performed when the mobile station updates its location.

5. A method of claim 2, wherein checking the mobile equipment identify is performed at predefined intervals.

6. A method as claimed in claim 1, wherein the database is created in the home location register.

7. A mobile system comprising:
    a receiving device configured to receive an international mobile equipment identity and at least one international mobile subscriber identity from at least one mobile station;
    a database configured to contain records, each containing a mobile equipment identity associated with a mobile station and at least one mobile subscriber identity;
    a first identity device configured to first check whether the database contains a record which contains a mobile equipment identity corresponding to the mobile equipment identity transmitted by the mobile station;
    a second identity device configured to further check, in response to said record being found by the first identity device, whether a mobile subscriber identity contained in said record corresponds to that transmitted by the mobile station; and
    an alert device configured, in response to the second identity device to produce a signal indicating that the mobile equipment identity is possibly a copied one.

8. A mobile system as claimed in claim 7, comprising a third device responsive to the first identity device configured to prevent the use of the mobile station.

9. An element of a mobile network comprising:
    means for receiving an international mobile equipment identity and at least one international mobile subscriber identity from at least one mobile station;

means for requesting at least one international mobile subscriber identity from a database on the basis of the international mobile equipment identity received from at least one mobile station, said database containing records, each record containing a mobile equipment identity associated with a mobile station and at least one mobile subscriber identity, wherein the mobile equipment identity associated with the mobile station is registered in the mobile system;

first means for checking, whether the international mobile subscriber identity corresponds to the international mobile subscriber identity first transmitted by the mobile station; and second means responsive to the first means to produce, if the international mobile subscriber identity does not correspond to the international mobile subscriber identity transmitted by the mobile station, at least a signal indicating that the mobile equipment identity is possibly a copied one.

10. An element as claimed in claim 9, wherein the database is located within the element.

11. An element of a mobile network comprising:

a receiving unit configured to receive an international mobile equipment identity and at least one international mobile subscriber identity from at least one mobile station;

a request unit configured to request at least one international mobile subscriber identity from a database on the basis of the international mobile equipment identity received from at least one mobile station, said database containing records, each record containing a mobile equipment identity associated with a mobile station and at least one mobile subscriber identity, wherein the mobile equipment identify associated with the mobile station is an registered in the mobile system;

an identification unit configured to check whether the international mobile subscriber identity corresponds to the international mobile subscriber identity first transmitted by the mobile station; and an indication unit configured to produce, in response to the identification unit, at least a signal indicating that the mobile equipment identity is possibly a copied one, if the international mobile subscriber identity does not correspond to the international mobile subscriber identity transmitted by the mobile station.

12. A computer program product embodied in a computer readable medium for detecting a copied international mobile equipment identity in a mobile system in which at least one international mobile subscriber identity and a mobile equipment identity is associated with a mobile station, comprising:

a database configured to contain records, each of which contains a mobile equipment identity associated with a mobile station and at least one mobile subscriber identity;

an input for receiving an international mobile equipment identity and at least one international mobile subscriber identity from at least one mobile station;

a requester configured to request at least one international mobile subscriber identity from the database on the basis of the received international mobile equipment identity, wherein the mobile equipment identify associated with the mobile station is an registered in the mobile system;

a comparator configured to compare the requested international mobile subscriber identity corresponds to the received international mobile subscriber identity; and an output configured to, responsive to a result of the comparator, produce, if the requested international mobile subscriber identity does not correspond to the received international mobile subscriber identity, at least a signal indicating that the mobile equipment identity is possibly a copied one.

\* \* \* \* \*